Jan. 17, 1961  J. D. LEAL  2,968,324
SCREEN WIRE STRETCHER
Filed Oct. 16, 1958  3 Sheets-Sheet 1

John D. Leal
INVENTOR.

Jan. 17, 1961 J. D. LEAL 2,968,324
SCREEN WIRE STRETCHER
Filed Oct. 16, 1958 3 Sheets-Sheet 3

John D. Leal
INVENTOR.

United States Patent Office 2,968,324
Patented Jan. 17, 1961

2,968,324
SCREEN WIRE STRETCHER
John D. Leal, Rte. 1, 9/10 Mile Teege Road, Harlingen, Tex.

Filed Oct. 16, 1958, Ser. No. 767,616

2 Claims. (Cl. 140—109)

This invention relates to apparatus for saving time and labor while applying screen onto frames for windows or screen doors.

An object of the invention is to provide a device for facilitating the application of hardware cloth, for instance screen, to frames that are ultimately made into window screens, screen doors and the like.

A further object of the invention is to provide a practical device of the nature mentioned above, wherein the frame is located on a supporting surface and the screen to be applied to the frame is attached at one edge to an end or side of the frame. Thereafter the screen is gripped at a location beyond the opposite side or end of the frame, and the frame is physically translated thereby pulling the screen very tight on the frame. In this condition the screen may be tacked, stapled or otherwise fastened all around the frame, after which it is cut from the roll or other supply of screen. This is all that is necessary for the successful application of a tight screen on a frame.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is a sectional view taken on the line 2—2 of Figure 1.

Figure 1:
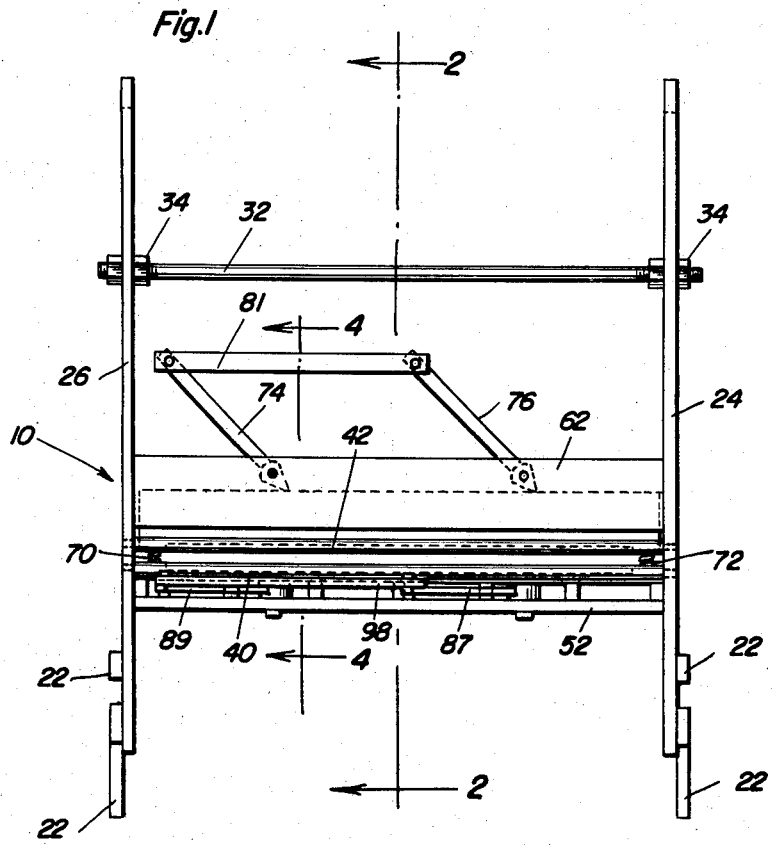
Figure 1 is a front elevational view of a device constructed in accordance with the invention.
Figure 3:
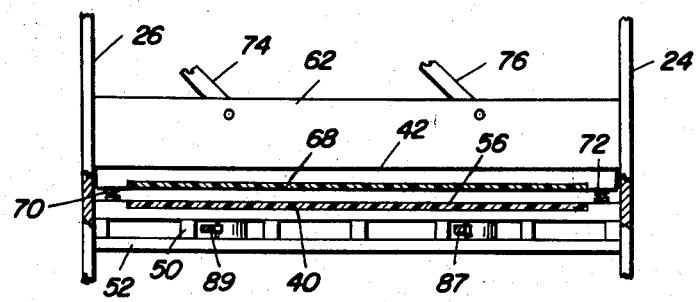
Figure 3 is a sectional view taken approximately on the line 3—3 of Figure 2.
Figure 4:
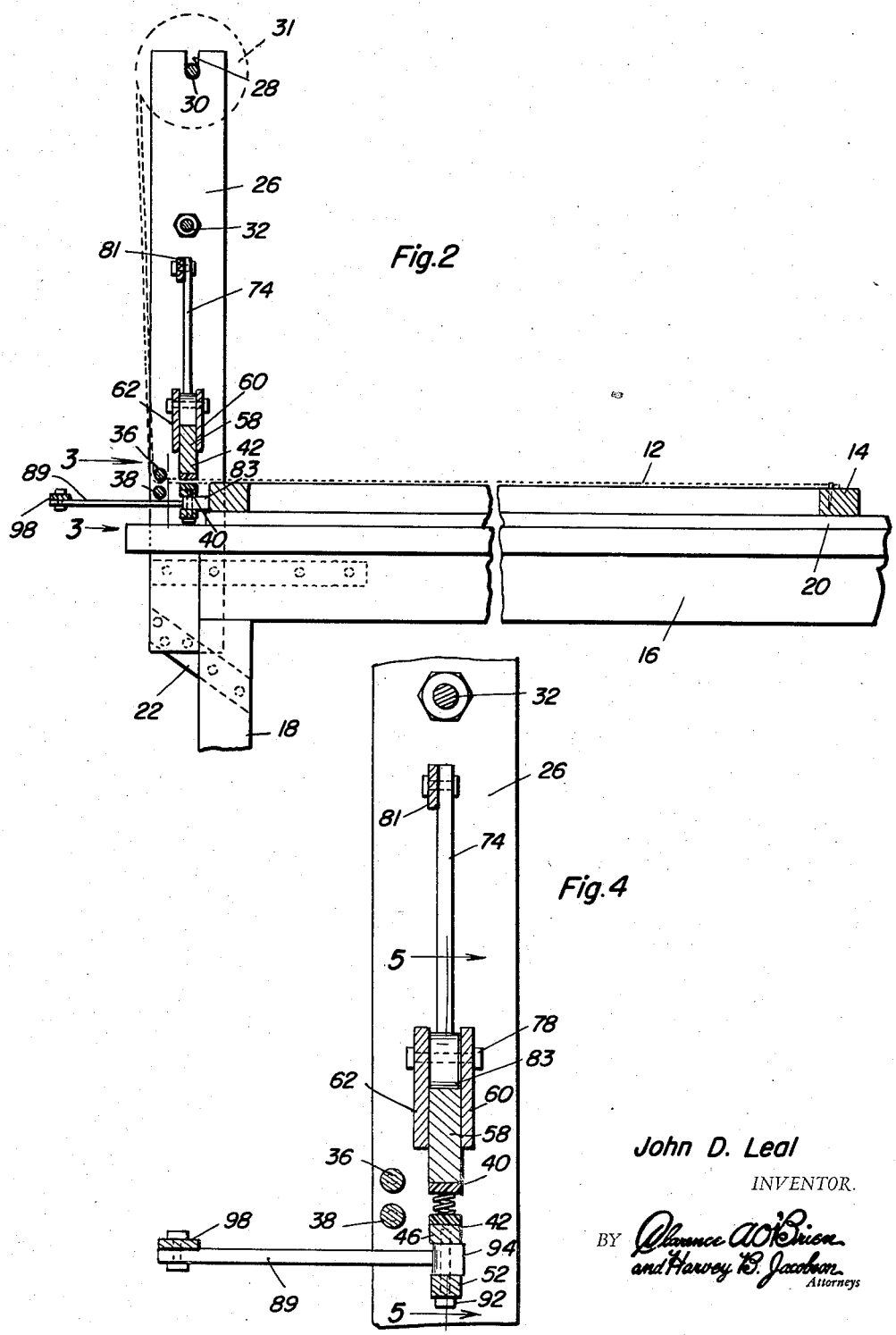
Figure 4 is a sectional view taken on the line 4—4 of Figure 1.

In the accompanying drawings there is shown a device 10 for facilitating the application of screen 12 or any other type of hardware or other cloth-like material onto a frame 14. The frame may have any utimate use, for instance it may be a window screen, door screen, room divider, etc. The machine or device 10 is preferably used on a table, for example table 16, and the table would ordinarily have legs 18 and a table top 20 on which frame 14 is placed. The device 10 is shown attached to the table 16 by straps 22, the attachment to the table being made solely to stabilize the machine. The machine or device 10 has sides 24 and 26 lower ends of which are attached by straps 22 to the table and which have upwardly opening notches 28 in which to receive spindle 30 of the roll 31 of screen 12. Stay rod 32 extends across the sides 24 and 26 and is attached thereto, for instance by nuts 34. This further stabilizes the structural support for the machine 10.

Screen 12 is unwound from roll 31 and passed between a pair of guides 36 and 38 consisting of transverse bars that may be fixed to sides 24 and 26 or may be rotatably journalled therein. The guides 38 and 36 are parallel to each other and spaced apart slightly at a location spaced above the surface of the table top 20. The screen 12 is passed through a pair of jaws 40 and 42 and pulled to a position so that the outer edge of the screen 12 is above the farthest side of frame 14. It is then tacked, stapled or attached in any other conventional way to the farthest side of frame 14.

Figure 5:
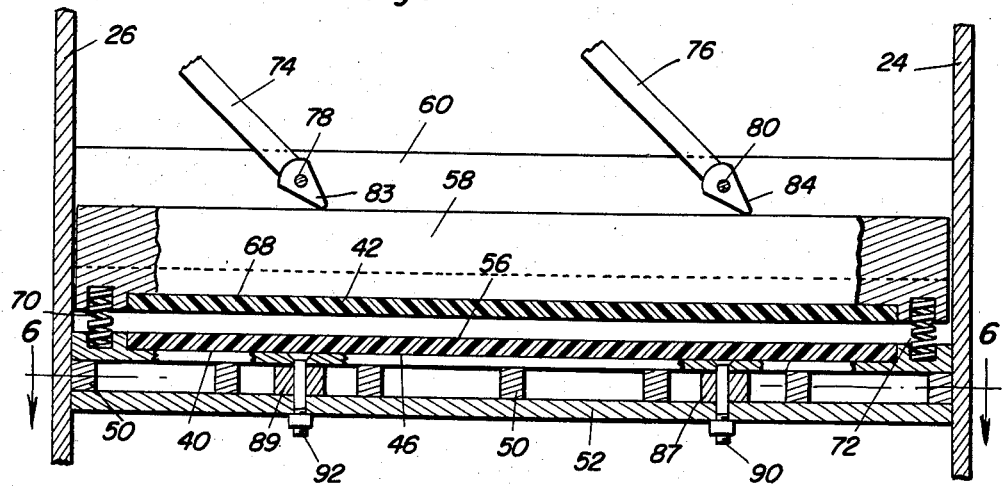
Figure 5 is a sectional view taken on the line 5—5 of Figure 4.

Jaws 40 and 42 are of special construction. The jaw 40 that is, the lower jaw is made of a transverse bar 46 that extends across sides 24 and 26 and that is supported on spacers 50 (Figure 5) which are located on a transverse frame member 52 parallel to bar 46 and secured to sides 24 and 26. The gripping surface 56 of jaw 40 is formed by a pad that is inset in bar 46 and the pad may be of any material to enhance the gripping action of the jaw on the screen. For instance the jaw may be made of rubber, canvas, plastic or other suitable materials. Jaw 42 is a movable jaw and constructed of a floating member 58 disposed between guide members 60 and 62 that are secured to and extend between sides 24 and 26. Jaw gripping surface 68 is formed of a material similar to the gripping surface 56 and confronts the gripping surface 56. A pair of springs 70 and 72 are located in opposing recesses in the two jaws and are used to hold the jaws in the normally open or separated position. The jaws are brought together to clamp firmly on the screen 12 by operation of a pair of levers 74 and 76 (Figure 5) which are mounted for pivotal movement on pins 78 and 80 that extend between and are attached to the guides 60 and 62. The lower extremities of the levers 74 and 76 function as cams in that they bear against the upper edge of floating jaw member 58. The levers are tied together by means of handle 81 that is pivoted to the upper extremity of each lever. Movement of the handle 81 in one direction, therefore, causes the jaw 42 to be depressed against yielding opposition of springs 70 and 72 and to clamp the screen located between the jaws. Note that it requires only one manual operation and in one direction for closing the jaws, and they remain closed because the distance between the axis of rotation of each lever 74 and 76 and the outer extremity of the cams 83 and 84 formed at the inner ends of the levers is correct for having the jaw gripping surfaces brought firmly against each other or the screen located therebetween.

Figure 6:
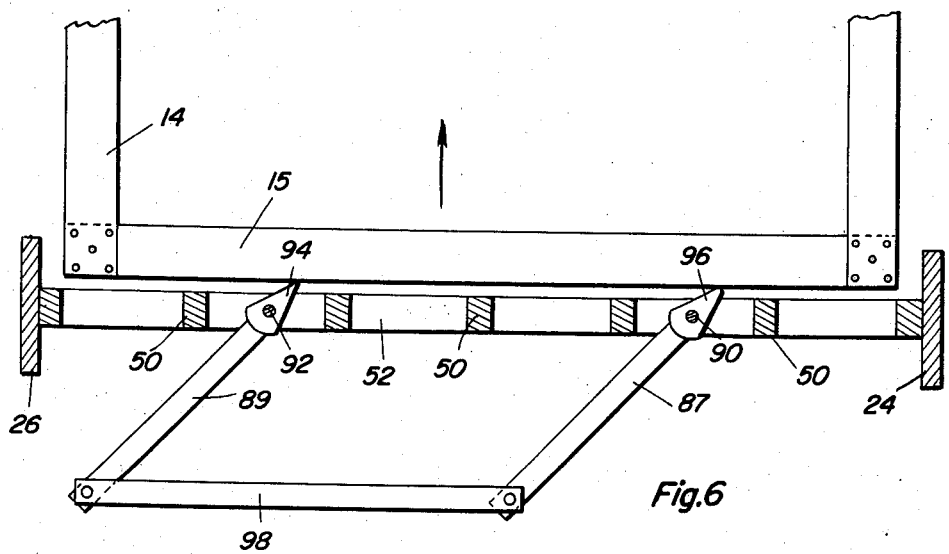
Figure 6 is a sectional view taken on the line 6—6 of Figure 5.

When the screen is handled in the manner described above and attached to the farthest side of the frame 14, and the screen is gripped between the pair of jaws, the frame 14 is moved slightly in a direction tending to pull the screen taut. This shifting of the frame 14 with the screen attached to one of its sides is achieved by a pair of levers 87 and 89 which are mounted on pivots 90 and 92 extending between frame member 52 and jaw 42. The pivots may be in the form of bolts (Figure 5) or some other equivalent. Cams 94 and 96 are formed at the inner extremities of the levers 87 and 89 and they are adapted to abut the side 15 of frame 14, the side 15 being the side of the frame that is directly opposite that which has screen 12 fastened to it (Figure 1). The outer extremities of the levers 87 and 89 are tied together by means of a handle 98, the handle preferably being a link which is pivoted to both levers 89 and 87 so that the levers operate in unison. It is evident from inspection of Figure 6 that when the levers 87 and 89 are swung in one direction, the cams 94 and 96 thereon will shift frame 14 thereby pulling the screen very tight over the surface of frame 14. In this condition the screen may be attached all the way around the frame and then cut off. The result is that frame 14 is provided with a very tight screen, and it is obvious that the job may be completed much more quickly than by using ordinary methods of screening a frame.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a device for mounting screen on a frame, the combination of a frame supporting table, a pair of transversely spaced uprights secured to one edge of said table and extending upwardly therefrom, a screen roll supporting rod extending transversely between upper ends of said uprights, a transverse guide rod extending between lower end portions of the uprights substantially at the level of a frame positioned on said table whereby screen from said roll may be passed under said guide rod and over the stated frame, a transversely elongated lower jaw extending between and secured to said uprights adjacent said guide rod, a pair of spaced juxtaposed guide bars extending between and secured to said uprights above said lower jaw, a transversely elongated upper jaw slidable vertically in the space between said guide bars toward and away from said lower jaw for clamping therebetween screen anchored to a side of the frame remote from said jaws, a pair of transversely spaced levers pivoted to said guide bars above the upper jaw and cammingly engaging the upper jaw for sliding the same toward the lower jaw, a link-shaped handle pivoted at its opposite ends to the respective levers for simultaneously actuating the same, a second pair of transversely spaced levers pivotally mounted below said lower jaw for swinging movement in a plane parallel to said table and adapted to cammingly engage a side of the frame adjacent said jaws for sliding the frame on said table away from the jaws to stretch the screen over the frame, and a second link-shaped handle pivoted at its opposite ends to the respective levers in the second pair for simultaneously actuating the same.

2. The device as defined in claim 1 wherein said jaws have opposing faces provided with transversely elongated recesses, and a pair of transversely elongated screen clamping pads of friction enhancing material mounted in said recesses.

References Cited in the file of this patent
UNITED STATES PATENTS

| | | |
|---|---|---|
| 367,538 | Mattson | Aug. 2, 1887 |
| 783,786 | Hoffman et al. | Feb. 28, 1905 |
| 1,649,350 | Jones | Nov. 15, 1927 |